(12) United States Patent
Zaun et al.

(10) Patent No.: US 6,250,398 B1
(45) Date of Patent: Jun. 26, 2001

(54) SPRING TRIP STANDARD

(75) Inventors: Richard David Zaun; Richard Wayne Hook, both of West Des Moines, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/216,270

(22) Filed: Dec. 18, 1998

(51) Int. Cl.$^7$ .................................................. A01B 39/20
(52) U.S. Cl. ....................... 172/710; 251/10.5; 172/265; 172/500
(58) Field of Search .................................. 172/705, 265, 172/264, 263, 262, 261, 707, 708, 709, 710, 711, 500, 497; 111/151; 267/177, 174; 254/10.5

(56) References Cited

U.S. PATENT DOCUMENTS

| | | |
|---|---|---|
| 513,043 * | 1/1894 | Hall ........................................ 172/265 |
| 868,714 * | 10/1907 | Skidmore ............................. 172/705 |
| 1,041,975 * | 10/1912 | Dennis ................................. 172/265 |
| 3,279,104 * | 10/1966 | Wandscheer et al. ................ 172/265 |
| 3,700,039 | 10/1972 | Essex et al. ........................... 172/265 |
| 3,782,481 | 1/1974 | Quanbeck ............................. 172/265 |
| 3,912,224 * | 10/1975 | Castoe .................................. 254/10.5 |
| 4,011,916 * | 3/1977 | Neal et al. .......................... 172/705 X |
| 4,200,157 * | 4/1980 | Anderson ........................... 172/705 X |
| 4,261,423 | 4/1981 | Williamson ........................... 172/705 |
| 4,321,971 | 3/1982 | Hake et al. ............................ 172/710 |
| 4,520,878 | 6/1985 | Smith et al. ........................... 172/705 |
| 4,679,780 * | 7/1987 | Kloster ................................. 267/177 |
| 4,683,959 * | 8/1987 | Clemens ............................ 172/705 X |
| 4,930,751 * | 6/1990 | Hutchins ............................... 254/10.5 |
| 5,524,712 * | 6/1996 | Balmer ................................. 172/311 |
| 5,787,992 * | 8/1998 | Dobson et al. ....................... 172/264 |
| 6,065,548 * | 5/2000 | Zaun et al. ............................ 172/265 |

OTHER PUBLICATIONS

Morris, 9100 Series Floating Hitch Cultivator, one page of brochure, publication date and location—unknown.
Sunflower, one page of brochure, publication date and location—unknown.

* cited by examiner

Primary Examiner—Victor Batson

(57) ABSTRACT

A spring trip standard for a tillage implement includes a coil spring freely and solely compressed between an upper spring-abutting surface on the mounting bracket and a lower spring-abutting surface on a casting which is connected by a transverse pivot to the mounting bracket. A tool supporting shank is bolted to the casting and biased downwardly into a ground working position by the spring. The casting includes an integral stop extending forwardly from the pivot. The stop contacts the bottom of the bracket when the shank is in the ground working position so that a tension link between the bracket and casting is eliminated. A spring guide through the coils is also obviated. A relatively high initial trip force prevents unwanted tripping of the shank and prevents looseness in the shank pivot so the lateral position of the tool is maintained. The spring-abutting surface on the casting includes a spring receiving projection to help maintain the spring position relative to the shank. The projection is slotted to receive a special tool for compressing the spring for standard disassembly and reassembly. The special tool also facilitates replacement of a bushing and sleeve assembly in the pivot with only partial disassembly.

21 Claims, 3 Drawing Sheets

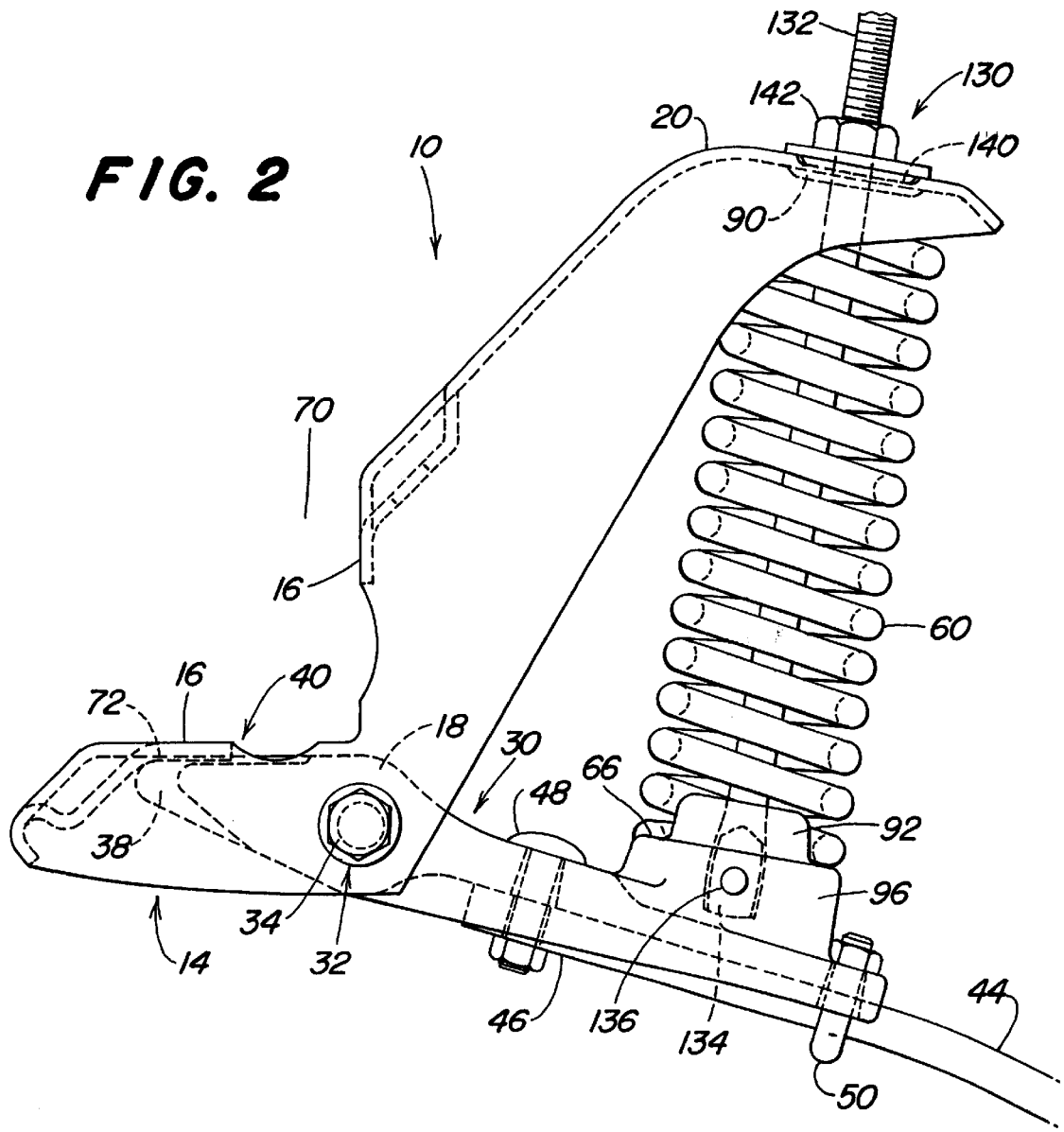

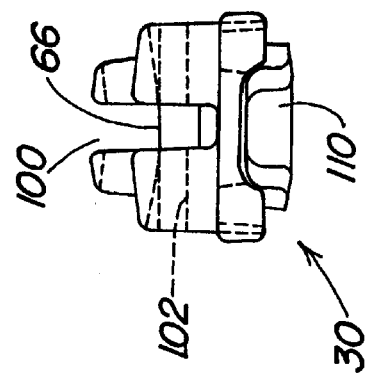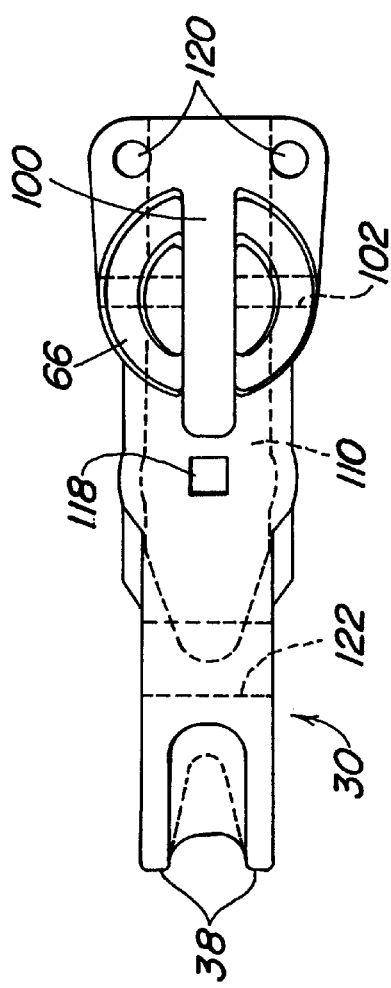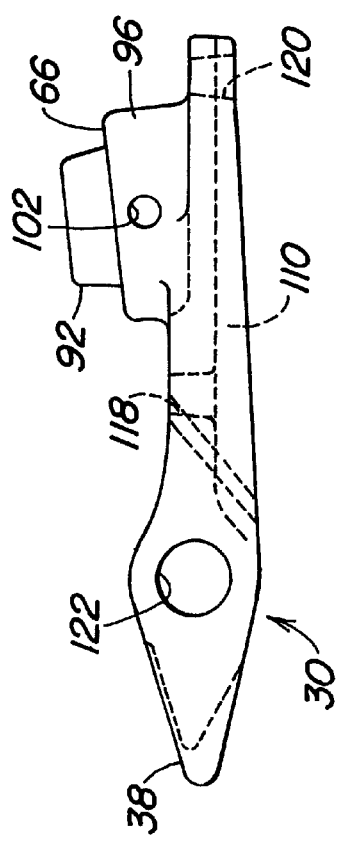

SPRING TRIP STANDARD

BACKGROUND OF THE INVENTION

1) Field of the Invention

The present invention relates generally to agricultural implements and, more specifically, to an improved and simplified spring trip standard for tillage implements.

2) Related Art

Spring trip standards typically include a mounting bracket attached to rectangular toolbar and extending upwardly and rearwardly to a downwardly and forwardly directed spring abutment surface. A spring is compressed between the abutment surface and an upwardly directed spring abutment surface on a member pivotally connected to the lower portion of the bracket, and a tool supporting shank is fixed to the member. A tension link assembly extends from the shank supporting member through the spring and through an aperture in the spring abutment surface on the bracket to adjust the preloading of the spring and vary the vertical position of the tool connected to the shank. Such an assembly is shown by way of example in U.S. Pat. No. 3,700,039 entitled SPRING TRIP SHANK ASSEMBLY. Such a shank assembly provides good trip force characteristics but has numerous parts and is expensive and time-consuming to assemble and repair. Previously available assemblies, particularly those with numerous tension link or spring support components such as pins, straps, spacers and washers, typically require extensive instructions for assembly and disassembly. In some shank assemblies, the tension link reduces forces on the pivot area in the at rest position, thereby introducing some looseness in the pivot joints which often is perceived as a quality disadvantage and which causes the tool to have some lateral shift during operation. Often the precompression of the spring when the tool is in the normal operating position is not sufficient to prevent some continual tripping action. The portion of the tension link extending through the aperture is subject to wear as a result of such tripping action.

In some spring trip shank assemblies such as shown in U.S. Pat. No. 4,520,878 the bottom of the coil spring rests on a seat which can swivel to maintain the lower face of the spring substantially normal to the longitudinal axis of the spring and thereby reduce spring buckling forces. Such arrangements require numerous components and are relatively difficult to assemble. The swiveling seat construction introduces additional wear components into the assembly.

BRIEF SUMMARY OF THE INVENTION

It is therefore an object of the present invention to provide an improved spring trip assembly for an implement. It is a further object to provide such an assembly which overcomes most or all of the aforementioned problems.

It is a further object of the present invention to provide an improved spring trip assembly which has fewer parts and is lower in cost than most previously available shank assemblies. It is another object to provide such an assembly which has fewer wear areas and requires less maintenance and repair than at least most previously available spring trip shank assemblies. It is another object to provide such an assembly which obviates a tension link extending through the spring for field operation. It is also an object to provide a simple spring compression structure to disassemble the parts only to the extent necessary for the desired component replacement or repair.

It is still another object of the invention to provide an improved spring trip shank assembly which is easier to assemble and disassemble than at least most previously available shank assemblies. It is another object of the invention to provide such an assembly which eliminates need for a tension link during field-working operations thereby eliminating an area of wear. It is a further object to provide such an assembly having a minimal number of parts. It is yet another object to provide such an assembly having an easily replaceable and inexpensive pivot assembly.

It is yet a further object of the present invention to provide an improved spring trip standard assembly having less looseness and better tool tracking than many previously available assemblies. It is yet another object to provide such an assembly which includes a positive downstop arrangement and obviates tension links through the coils of compression springs. It is a further object to provide such an assembly which has increased downpressure preloading for reducing unwanted tripping action. It is yet another object to provide such an assembly which does not require a pivoting spring seat or a spring retainer extending through the coils of the spring.

A spring trip standard for a tillage implement includes a coil spring compressed between an upper spring-abutting surface on the mounting bracket and a lower spring abutment surface on a casting which is connected by a transverse pivot to the mounting bracket. A tool supporting shank is bolted to the casting and biased downwardly into a ground working position by the spring. The casting includes an integral stop extending forwardly from the pivot. The stop contacts the bottom of the bracket when the shank is in the ground working position so that a tension link between the bracket and casting is eliminated. A relatively high trip force on the order of two hundred pounds or more prevents unwanted tripping of the shank and prevents looseness in the shank so the desired fore-and-aft and lateral position of the tool is maintained for maximum efficiency. The casting includes a spring receiving projection to help maintain the bottom of the spring in position. The projection is slotted to receive a simple tool for compressing the spring to disassemble and reassemble the standard. Wear only occurs in the components of a relatively inexpensive bushing and sleeve assembly in the pivot, and these components can be easily replaced using the tool to compress the spring and remove the loading from the pivot without complete disassembly of the unit. If complete disassembly is required for any reason, the tool permits complete relaxation of the spring. The shank assembly has a minimal number of components and is relatively inexpensive and easy to assemble.

These and other objects, features and advantages of the present invention will become apparent to one skilled in the art upon reading the following detailed description in view of the drawings.

BRIEF DESCRIPTION OF THE DRAWINGS

FIG. 2 is an enlarged view of a portion of the shank assembly of FIG. 1 showing the spring compression tool attached to the bracket casting for compressing the spring during disassembly.

FIG. 3 is an enlarged side view of the bracket casting.

FIG. 4 is a top view of the bracket casting of FIG. 3.

FIG. 5 is a rear view of the casting showing the spring compression tool-receiving slot.

DETAILED DESCRIPTION OF THE DRAWINGS

Figure 1:
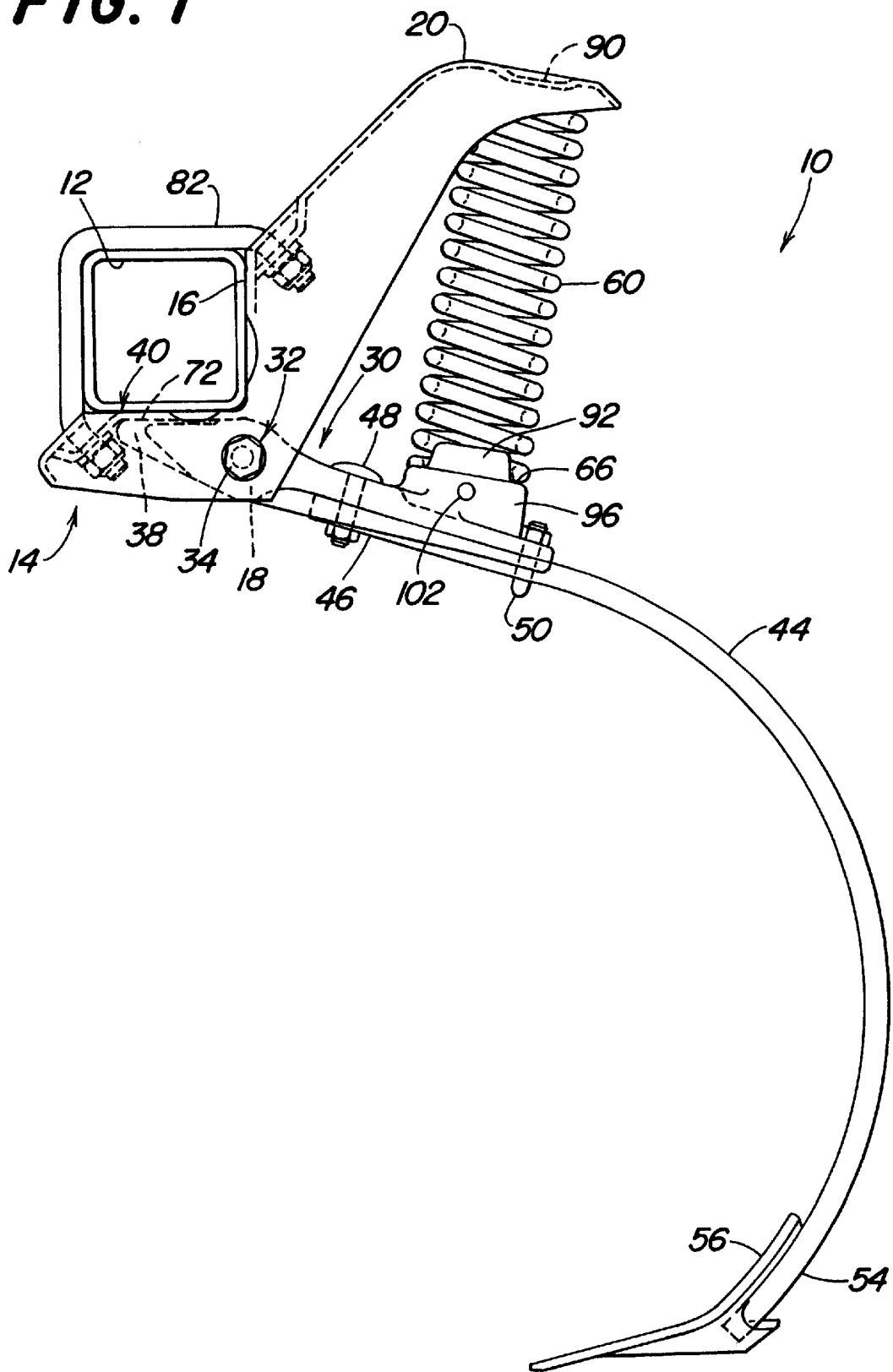
FIG. 1 is a side view of a spring trip shank assembly in the normal field-working position.

Referring now to FIG. 1, therein is shown a spring trip standard assembly 10 connected to a transversely extending implement toolbar 12 of rectangular cross section. The assembly 10 includes a rearwardly opening, channel-shaped bracket 14 having a forward mounting portion 16, a lower rear pivot area 18 and an upper spring-abutting surface 20 located rearwardly and above the pivot area 18.

A shank support casting 30 is pivotally connected to the rear pivot area 18 by a bushing and sleeve assembly 32 including a mounting bolt 34 with chrome-plated steel bushing extending through the casting between the sides of the bracket 14 below the forward, lowermost corner of the mounting portion 16. The casting 30 includes a fore-and-aft extension 38 projecting forwardly from the pivot area under the mounting portion 16 and defining a down stop area indicated generally at 40 which limits downward (clockwise as viewed in FIG. 1) pivoting to establish a preselected field-working position as shown in FIG. 1. A C-shaped shank includes an apertured upper end 46 connected by a bolt 48 to the casting 30. A U-bolt 50 secures the upper end 46 to the aft end of the casting 30. The shank curves downwardly and forwardly from the end 46 to a lowermost tool-receiving end 54 supporting an earthworking member or shovel 56.

A coil spring 60 is solely located and freely compressed between the upper spring-abutting surface 20 and a lower spring-abutting surface 66 on the casting 30 independently of any tension link or spring guide structure within the coils of the spring. The spring 60 is precompressed to provide at least approximately 200 pounds of downpressure when the spring trip shank assembly is in the field-working position with the downstop 40 bottomed out as shown in FIG. 1. The precompression of the spring 60 in combination with the action of the downstop 40 loads the pivot to prevent looseness in the bushing and sleeve assembly 32. The spring-abutting surfaces 20 and 66 are parallel (see broken lines of FIG. 1 indicating the planes of the surfaces) in the field-working position for optimum appearance and operation.

The channel-shaped bracket 14 includes a notched area which abuts the rear and bottom faces of the toolbar 12. The pivot area 18 is located below the aft portion of the notch 70, and the stop area 40 includes a bracket surface 72 having an upper side which abuts the lower face of the toolbar 12 to provide a solid stop for the casting extension 38. A conventional U-bolt clamping arrangement 82 extends around the toolbar 12 and through apertures in the bracket 14 to secure the assembly 10 to the toolbar.

The upper spring-abutting surface of the bracket 14 includes a circular indentation or downward projection 90 for maintaining the upper end of the coil spring 60 centered on the surface and for receiving portions of a spring compression tool described in detail below. A lower spring retaining projection 92 extends upwardly from the surface 66 on the casting 30 to help maintain the lower end of the coil spring located on the surface 66. A circular support base 96 extends upwardly from the casting 30. The base 96 and the projection 92 are slotted at 100 to define a fore-and-aft extending notch. A transverse bore 102 extends through the base 96. The bottom of the casting 30 includes a fore-and-aft extending cavity 110 opening rearwardly and downwardly and conforming generally to the shape of the upper end 46 of the shank 44. Apertures 118 and 120 extend vertically through the casting 30 to receive the mount bolt 48 and U-bolt 50 which secure the shank 44 to the casting. The casting includes a pivot-receiving bore 122 forwardly of the cavity 110 and behind the forward extension 38, which as best seen in FIG. 4, is bifurcated at the forward extremity to accommodate the mounting structure. A thin hardened split sleeve is pressed into the bore 122 and receives the chrome-plated steel bushing and mounting bolt 34. The bolt 34 is tightened against the sides of the bracket 14 and clamps the steel bushing so the split sleeve rotates on the stationary bushing. Therefore, the only wear that occurs in the pivot area 18 is in the bushing and sleeve which are relatively inexpensive and easy to replace.

The simple structure with minimum number of parts as described above allows the assembly 10 to be assembled during manufacture in substantially less than half the time of conventional shank arrangements. A spring compression tool 130 shown in FIG. 2 is provided with each implement so the operator can quickly disassemble or partially disassemble the structure. To replace the bushing and sleeve assembly 32 in the pivot area 18, only partial disassembly is required. The bushing and sleeve are the only wear items in the assembly. Total disassembly is only rarely required, for example, when it becomes necessary to replace the spring 60, the casting 66 or the bracket 14.

The tool 130 includes a long threaded rod member 132 having a flattened lower end 134 with an aperture adapted to align with the transverse bore 102 in the base 96. A pin 136 is received through the aperture and the bore 102 after the member 132 is inserted through an aperture in the downwardly directed projection 90. A plug 140 with a central aperture is seated in the indentation at the top surface of the projection 90 to provide a bearing surface for a nut 142 threaded onto the member 132. The nut 142 is tightened against the plug 140 to pivot the casting 30 upwardly to compress the spring 60 and move the extension 38 away from the stop surface 72, thereby unloading the bearing and sleeve assembly 32 for easy removal of pivot mounting bolt 34. For complete disassembly, the bolt 34 is removed as described above, and then the nut 142 is unthreaded on the member 132 until the spring 60 is completely relaxed. Thereafter, the pin 136 is removed to release the flattened end from the slot 100. The length of the member 132 is sufficient to assure full spring relaxation prior to the nut 142 running out of thread on the end of the member.

To reassemble the unit, the procedure is reversed. The spring 60 is inserted upwardly over the lower end of the member 132 (with the nut unthreaded towards the top of the threaded end of the member 132). The flattened end 134 is slid into the slot 100 with the aperture aligned with the bore 102, and the pin 136 is placed through the bore and flattened end. The nut 142 is then tightened until the spring 60 is compressed sufficiently for the bore 122 of the casting 30 to align with apertures in the pivot area of the bracket 14 without interference between the projection 38 and the bracket surface 72. The pivot pin 34 of the bearing and sleeve assembly 32 is then inserted and secured in position. Thereafter, the nut 142 is unthreaded until the stop bottoms out (the projection 38 hits the surface 72) and the tension in the member 132 is completely relieved by the stop 40. The pin 136 is removed, and the member 132 is pulled upwardly through the top of the bracket 14. The spring 60 is supported between the parallel spring-abutting surfaces 20 and 66 and positionally maintained by the projections 90 and 92 without a tension link or spring shape retention member extending through or around the spring coils. The high spring preloading maintains the tool 56 in the ground without unnecessary tripping of the standard.

Having described the preferred embodiment, it will become apparent that various modifications can be made without departing from the scope of the invention as defined in the accompanying claims.

What is claimed is:

1. A spring trip standard assembly adapted for mounting on a toolbar, the spring trip standard assembly adapted for supporting a tool and moving the tool forwardly through the ground, comprising:

a bracket adapted for securing to the toolbar, the bracket including an upper spring-abutting surface and a lower pivot area;

a shank member pivotally connected to the lower pivot area for pivoting about an axis transverse to the forward direction, the shank member extending rearwardly and downwardly from the pivot area to a tool-supporting end;

a lower spring-abutting surface located on the shank member and pivotable with the shank member about the axis, the lower spring-abutting surface located rearwardly of the pivot area and below the upper spring-abutting surface;

a coil spring compressed between the spring-abutting surfaces and biasing the tool-supporting end towards a ground engaging position, the coil spring having substantially open coils free of tension link structure within the coils between the spring-abutting surfaces when the tool is moving through the ground;

a stop located entirely outside the coils for preventing movement of the tool-supporting end below the ground engaging position; and wherein the shank member includes a fore-and-aft extending portion extending forwardly from the pivot area to an end located under the toolbar, the end defining a downstop limit preventing the shank member from pivoting downwardly about the axis below a preselected position.

2. The spring trip standard assembly as set forth in claim 1 wherein the spring-abutting surfaces are substantially parallel when the tool is in the ground engaging position.

3. A spring trip standard assembly adapted for mounting on a toolbar, the spring trip standard assembly adapted for supporting a tool and moving the tool forwardly through the ground, comprising:

a bracket adapted for securing to the toolbar, the bracket including an upper spring-abutting surface and a lower pivot area;

a shank member pivotally connected to the lower pivot area and extending rearwardly and downwardly therefrom to a tool-supporting end;

a lower spring-abutting surface located on the shank member rearwardly of the pivot area and below the upper spring-abutting surface;

a coil spring compressed between the spring-abutting surfaces and biasing the tool-supporting end towards a ground engaging position, the coil spring having substantially open coils free of tension link structure within the coils between the spring-abutting surfaces when the tool is moving through the ground;

a stop located entirely outside the coils for preventing movement of the tool-supporting end below the ground engaging position; and further comprising a selectively removable spring compression member for compressing the spring during assembly and disassembly of the spring trip standard assembly, the compression member extending between the spring-abutting surfaces when attached and removed from the spring trip standard assembly while the assembly is moving the tool through the ground.

4. The spring trip standard assembly as set forth in claim 3 wherein the lower spring-abutting surface includes a slot for receiving the compression member, and a pin for releasably securing the compression member in the slot.

5. The spring trip standard assembly as set forth in claim 3 wherein the compression member comprises a threaded rod extending through the coils.

6. The spring trip standard assembly as set forth in claim 5 wherein the threaded rod is releasably secured to the lower spring-abutting surface and extends through an aperture in the upper spring-abutting surface.

7. The spring trip standard assembly as set forth in claim 4 wherein the spring compression member is insertable downwardly through the upper spring-abutting surface, and the pin is insertable through an aperture in the compression member.

8. The spring trip standard assembly as set forth in claim 3 wherein the stop member is located on the shank member and contacts the bracket when the tool supporting end is in the ground engaging position, and further comprising a removable bearing structure connecting the shank member to the pivot area, the stop and spring providing loading on the bearing structure to prevent looseness in the pivot area when the tool-supporting end is in the ground-engaging position, and wherein the compression member, when attached, substantially removes the loading on the bearing structure to facilitate bearing structure replacement.

9. A spring trip standard assembly adapted for mounting on a toolbar, the spring trip standard assembly adapted for forward movement over the ground during field-working operations and comprising:

a bracket adapted for securing to the toolbar, the bracket including an upper, downwardly directed spring-abutting surface with an aperture and a lower pivot area located forwardly and below the upper, downwardly directed spring-abutting surface;

shank structure pivotally connected to the lower pivot area and extending rearwardly and downwardly therefrom to a tool-supporting end;

a lower, upwardly directed spring-abutting surface located on the shank structure below the upper spring-abutting surface, the upper and lower spring-abutting surfaces defining a spring-receiving area between the shank structure and the bracket; and a coil spring compressed and solely located in the spring-receiving area between the spring-abutting surfaces, the coil spring having open coils and biasing the tool-supporting end towards a ground engaging position and being substantially free of tension linkage structure extending through the spring; and wherein the shank structure includes a stop member extending radially from the lower pivot area and preventing downward rocking of the shank structure below a preselected field-working position.

10. A spring trip standard assembly adapted for mounting on a toolbar, the spring trip standard assembly adapted for forward movement over the ground during field-working operations and comprising:

a bracket adapted for securing to the toolbar, the bracket including an upper spring-abutting surface and a lower pivot area;

shank structure pivotally connected to the lower pivot area and extending rearwardly and downwardly therefrom to a tool-supporting end;

a lower spring-abutting surface located on the shank structure below the upper spring-abutting surface, the upper and lower spring-abutting surfaces defining a spring-receiving area between the shank structure and the bracket;

a coil spring compressed and solely located in the spring-receiving area between the spring-abutting surfaces, the coil spring having open coils and biasing the tool-supporting end towards a ground engaging position and being substantially free of tension linkage structure extending through the spring; and a removable spring compression structure having a lower end selectively attachable to the shank structure and an upper portion connected to the bracket adjacent the upper spring-abutting surface.

11. The spring trip shank assembly as set forth in claim 10 wherein the compression structure includes a rod member insertable through an aperture in the upper spring-abutting surface and having a lower end, the shank structure including a slot for receiving the lower end as the rod is inserted through the aperture.

12. The spring trip shank assembly as set forth in claim 11 wherein the lower end of the rod includes a rod aperture and the shank structure includes a shank aperture alienable with the rod aperture, and further comprising a pin insertable through the rod and shank apertures when aligned to releasably secure the lower end to the shank structure.

13. The spring trip shank assembly as set forth in claim 11 wherein the rod member has an upper threaded end projecting above the aperture in the upper spring-abutting surface when the rod member is inserted, and a nut member threaded onto the threaded end for compressing the coil spring.

14. The spring trip shank assembly as set forth in claim 13 wherein the rod member is insertable through coils of the spring.

15. A spring trip standard for a tillage implement adapted for forward movement over the ground, the standard including a mounting bracket having an upper spring-abutting surface and a downwardly facing bracket surface, a shank support including a pivot connected to the mounting bracket and a lower spring-receiving surface located below the upper spring-abutting surface, a coil spring solely located and freely compressed between the upper spring-abutting surface and the lower spring-receiving surface, a tool supporting shank connected to the shank support and biased downwardly into a ground working position by the coil spring during field working operations, and wherein the shank support includes a stop extending forwardly from the pivot and contacting downwardly facing bracket surface at a location forwardly of the pivot when the shank is in the ground working position and limiting movement of the shank downwardly beyond the ground working position so that a tension link between the bracket and shank support is eliminated and wherein the coil spring includes a plurality of coils between the upper spring-abutting surface and the lower spring-receiving surface, the coils open and free of any structure therein.

16. The spring trip shank assembly as set forth in claim 15 wherein the shank support includes a spring receiving projection to help maintain the coil spring in position on the shank support, the spring receiving projection including a tool receiving slot for receiving a removable spring compression member.

17. The spring trip shank assembly as set forth in claim 15 wherein the coil spring, when the shank is in the ground working position, is compressed to provided a substantial initial trip force to prevent unwanted tripping and looseness in the pivot, and wherein the upper spring-abutting surface and the lower spring-abutting surface are substantially in parallel relationship when the shank is in the ground working position.

18. The spring trip shank assembly as set forth in claim 15 wherein the pivot includes a bushing and sleeve assembly pivotally connecting the shank support to the mounting bracket, the stop and coil spring compression preventing looseness in the pivot.

19. The spring trip shank assembly as set forth in claim 18 wherein the shank support is a casting, and wherein the stop is integral with the casting.

20. The spring trip shank assembly as set forth in claim 15 wherein the downwardly facing bracket surface defines a lower toolbar surface abutting portion of the bracket.

21. A spring trip standard for a tillage implement adapted for forward movement over the ground, the standard including a mounting bracket having an upper spring-abutting surface, a shank support including a pivot connected to the mounting bracket and a lower spring-receiving surface located below the upper spring-abutting surface, a coil spring solely located and freely compressed between the upper spring-abutting surface and the lower spring-receiving surface, a tool supporting shank connected to the shank support and biased downwardly into a ground working position by the coil spring during field working operations, and wherein the shank support includes a stop extending from the pivot and contacting a bottom portion of the bracket when the shank is in the ground working position and limiting movement of the shank downwardly beyond the ground working position so that a tension link between the bracket and shank support is eliminated and the coil spring includes a plurality of coils between the upper spring-abutting surface and the lower spring-receiving surface, the coils open and free of any structure therein, wherein the shank support includes a spring receiving projection to help maintain the coil spring in position on the shank support, and including a removable spring compression member, wherein the projection is slotted to removably receive the spring compression member for compressing the spring for disassembly of the spring trip shank assembly, and wherein the spring compression member is removed from the spring trip shank assembly during the field working operations.

* * * * *